July 1, 1930. M. GREEN ET AL 1,769,057
HIGH ACID PHOSPHATES OF IRON AND METHOD OF MAKING THE SAME
Filed Oct. 24, 1925
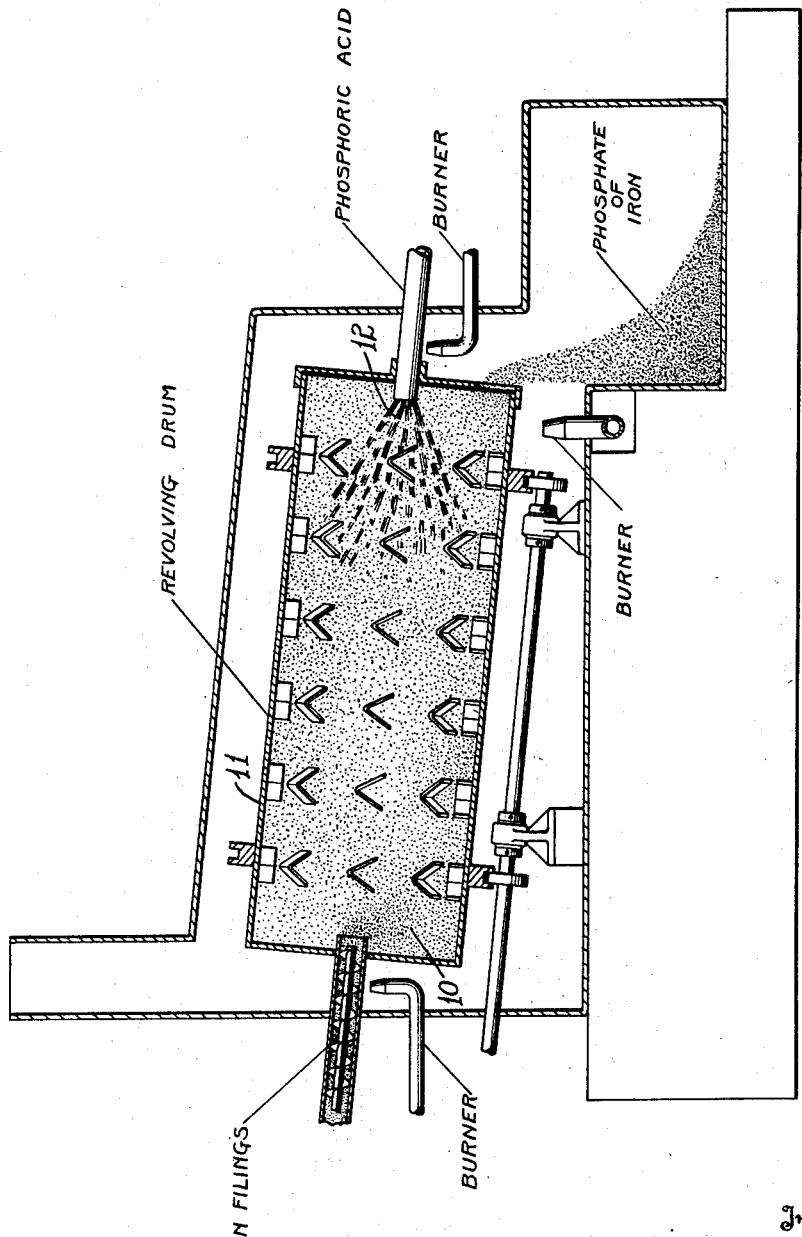

Patented July 1, 1930

1,769,057

UNITED STATES PATENT OFFICE

MATTHEW GREEN AND ELMER M. JONES, OF DETROIT, MICHIGAN, ASSIGNORS TO PARKER RUST-PROOF COMPANY, OF DETROIT, MICHIGAN, A CORPORATION OF MICHIGAN

HIGH-ACID PHOSPHATES OF IRON AND METHOD OF MAKING THE SAME

Application filed October 24, 1925. Serial No. 64,568.

Our invention relates to crystallized high acid phosphates of iron, and a process of making the same. While our product may be used for various purposes, it is particularly adapted for use in rust-proofing iron articles.

Iron forms a series of phosphates, ranging from high acid to basic. The high acid salts are soluble in water, while the low acid and basic salts are but slightly soluble or are insoluble. When strong phosphoric acid directly contacts iron, high acid phosphates are formed. The low acid or basic phosphates can be formed on the surface of iron articles, so as to rust-proof them, by immersing them in a weak solution of phosphoric acid containing phosphates of iron, or in a weak solution of the high acid phosphates of iron.

We have found that crystallized high acid phosphates of iron constitutes a very desirable material for forming a rust proofing solution, and have discovered a way in which this substance can be produced in a cheap and efficient manner.

In the accompanying drawings our method is illustrated diagrammatically.

We take iron filings or borings, or other finely divided iron particles 10, and stir them rapidly, as by placing them in a drum 11 rotating about an axis at a slight incline to the horizontal, the rotation being at such speed that the particles are continuously dropped from the upper portion of the drum, and so are effectively separated and exposed to the fluids within the drum. We then spray upon these falling particles of iron an ordinary commercial, about 65%, solution of phosphoric acid, indicated in the drawings at 12. The acid combines with the iron and forms highly acid phosphates of iron which crystallize and absorb, as water of crystallization, the water of the solution.

Spraying the acid onto the falling iron produces a maximum of direct contact between the acid and iron, and so produces a very rapid formation of phosphates. This is advantageous for two reasons. In the first place, the more rapidly the phosphates are formed, the less danger there is of forming low acid of basic salts.

In the second place if the salts are formed slowly and with the iron and acid in one mass, the resultant product is apt to be one solidified lump, whereas the rapid formation of the salts in small isolated masses results in the formation of small separate crystals.

While not absolutely necessary, it is preferable to have the acid heated to 100° C. or above before contacting the iron, as the resultant action is more prompt and satisfactory than where colder acid is used. However, the acid should not be heated enough to drive off any considerable amount of water. If desired, the iron instead of the acid may be heated, with a similar result as to temperature at the reacting surfaces. By heating both acid and iron and controlling the temperature of the gases in which the reaction takes place, the temperature of the reacting surfaces may be accurately controlled and rendered uniform.

The separate small crystals are very convenient to handle, and, when mixed with water, have a great extent of exposed surface so that they are quickly soluble, and, as they contain very little low acid or basic salts, they are quite completely soluble.

The mixing drum may take the form of a cylinder, having an inclined axis, and the iron particles may be fed into the upper end continuously and the crystals discharged at the lower end, the particles being exposed, during their travel, to a spray of a solution of phosphoric acid. We have found it advisable to use about two quarts of the ordinary commercial, or 65%, solution of phosphoric acid to one pound 2.29 oz. of the iron particles.

While the product is not an entirely definite pure chemical compound, and the exact formula may be in dispute, the proportions used in the preparation and other tests we have made seem to indicate that the material is, for the most part, ferrous di-hydrogen orthophosphate.

While we have described our method of bringing the iron and phosphoric acid into intimate contact, it could be accomplished in various other ways. Various other changes may be made in the exact process described by way of illustration without departing from the scope of our invention, which is defined in the appended claims.

What we claim is:

1. The process of making high acid orthophosphates of iron, which consists in heating a strong solution of phosphoric acid, heating iron particles to substantially the same temperature as the acid, separating the particles in gases having substantially the same temperature, and spraying the heated acid through the heated gases onto the separated particles.

2. The process of making high acid orthophosphates of iron, which consists in dropping iron particles and spraying a strong solution of phosphoric acid onto the particles while they fall.

3. The process of making granular crystallized ferrous di-hydrogen phosphate, which consists in spraying an approximately 65% solution of phosphoric acid upon separated particles of iron in substantially the proportion of two quarts of the solution to one pound 2.29 ounces of iron.

4. The process of making high acid orthophosphates of iron, which consists in dropping iron particles through a gaseous medium and spraying a strong solution of phosphoric acid onto the particles as they fall while controlling the temperatures so that the contacting surface of acid and iron is as hot as 100° C.

5. The process of making high acid orthophosphates of iron, which consists in dropping iron particles through a gaseous medium and spraying a strong solution of phosphoric acid onto the particles as they fall while keeping acid, iron and gaseous medium at a substantially uniform tempertature.

6. The process of making high acid orthophosphates of iron, which consists in dropping iron particles through a gaseous medium and spraying an approximately 65% solution of phosphoric acid onto the particles as they fall and in the proportion of approximately two quarts of the solution to one pound 2.29 ounces of iron and while maintaining the acid, iron and gaseous medium at a uniform temperature as high as 100° C.

In testimony whereof we have hereunto signed our names to this specification.

MATTHEW GREEN.
ELMER M. JONES.